E. F. BEUGLER.
STAVE JOINTING MACHINE.
APPLICATION FILED MAR. 13, 1913.

1,105,609.

Patented Aug. 4, 1914.
9 SHEETS—SHEET 3.

Fig. 3.

Witnesses:—
Richard Sommer
D. H. Harper

Inventor
Edwin F. Beugler
By A. J. Sangster
Attorney

E. F. BEUGLER.
STAVE JOINTING MACHINE.
APPLICATION FILED MAR. 13, 1913.

1,105,609.

Patented Aug. 4, 1914.
9 SHEETS—SHEET 4.

Fig. 4.

Witnesses:
Richard Sommer
D. H. Harper

Inventor
Edwin F. Beugler
by A. J. Sangster
Attorney

E. F. BEUGLER.
STAVE JOINTING MACHINE.
APPLICATION FILED MAR. 13, 1913.

1,105,609.

Patented Aug. 4, 1914.
9 SHEETS—SHEET 5.

E. F. BEUGLER.
STAVE JOINTING MACHINE.
APPLICATION FILED MAR. 13, 1913.

1,105,609.

Patented Aug. 4, 1914.
9 SHEETS—SHEET 9.

Fig. 17.

Witnesses:—
Richard Sommer
D. H. Harper.

Inventor
Edwin F. Beugler
by A. J. Sangster
Attorney

UNITED STATES PATENT OFFICE.

EDWIN F. BEUGLER, OF BUFFALO, NEW YORK, ASSIGNOR TO E. & B. HOLMES MACHINERY CO., OF BUFFALO, NEW YORK, A CORPORATION OF NEW YORK.

STAVE-JOINTING MACHINE.

1,105,609.

Specification of Letters Patent.

Patented Aug. 4, 1914.

Application filed March 13, 1913. Serial No. 753,987.

*To all whom it may concern:*

Be it known that I, EDWIN F. BEUGLER, a citizen of the United States, residing at Buffalo, in the county of Erie and State of New York, have invented certain new and useful Improvements in Stave-Jointing Machines, of which the following is a specification.

My invention relates to stave jointing machines.

The object of my invention is to provide a machine for jointing barrel staves possessing the improvements and advantages which will be evident from the following specification and the novel features particularly specified in the claims.

It will be understood by those familiar with the art that barrel staves are formed from blanks or slats of wood, cut to the proper length and of varying widths. These blanks must be beveled on their edges to an angle approximately conformable to the barrel radius, and must also be so beveled on curved lines conformable to the desired bilge of the barrel; and, as will hereafter more fully appear, this curvature must be greater or less with reference to a given stave according to its width. By means of my improvements I am able to perform these several functions with speed and accuracy by using a circular saw and the several mechanisms and combinations which I will now describe by reference to the annexed drawings forming a part of this specification, and in which like characters of reference indicate corresponding parts.

The mechanism is mounted upon a main frame of any desired form of construction, as the rectangular front casting 1, the rectangular back casting 2 and the connecting cross-pieces 3 and 4.

I will first describe the several mechanisms, and then describe their joint or successive operations.

*Application of power.*—Power is applied to ordinary belt-shift pulleys 8 and $8^a$ through a belt connecting with any proper source of power. These pulleys 8 and $8^a$ are mounted upon the shaft 7, one loose and the other keyed in the usual manner. The shaft 7 rotates in bearings 6 upon the upwardly extending arms 5, which are secured to or integral with the frame of the machine.

*Saw rotation.*—The saw 38 is constantly driven in rotation in the following manner: A belt 35 passes over a pulley 39 on the saw arbor 40, which rotates in bearings 41; thence over a pulley 42 on the shaft 7; thence over a pulley 43 mounted on a shaft 44 carried on a pivoted arm 45; and thence over a pulley 46 which travels with the saw carriage. The pulley 43 tightens the belt by means of a slotted segment 49 adjustably secured to the frame of the machine.

*Intermittent movements.*—The parts of the machine having intermittent movement are driven by a pulley 9 keyed to the shaft 7 carrying a belt 10 which engages over a pulley 11, mounted to rotate freely on the shaft 12, said pulley 11 being a member of a clutch mechanism hereafter described. The shaft 12 transmits its intermittent movement to the shaft 20 through a pinion 32 and a spur-gear 31.

Figure 1:
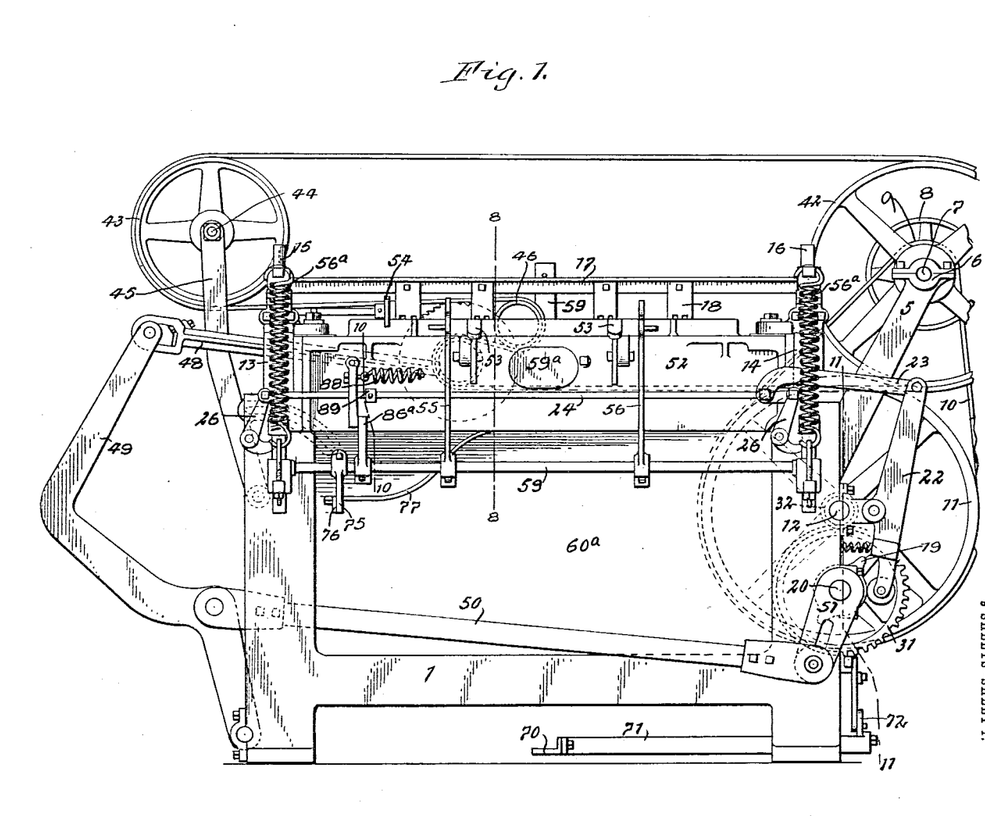
Figure 1 is a side elevation, showing the front side of the machine.
Figure 2:
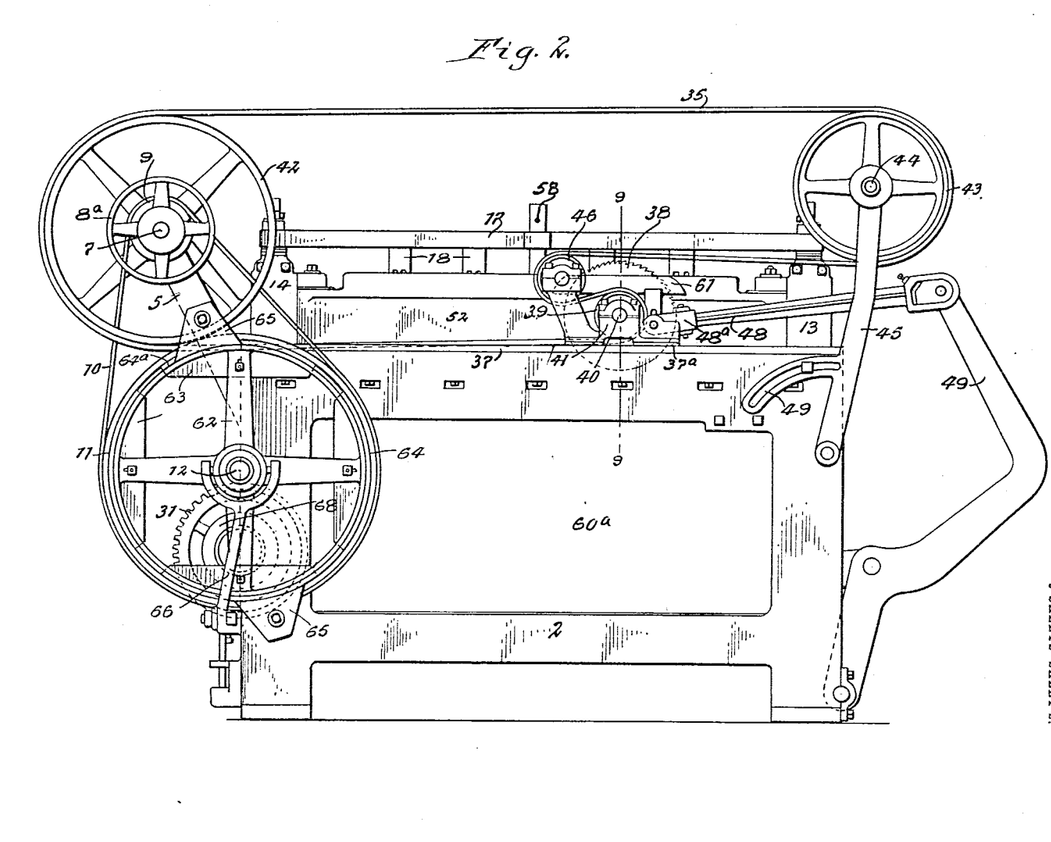
Fig. 2 is a back side elevation.
Figure 3:
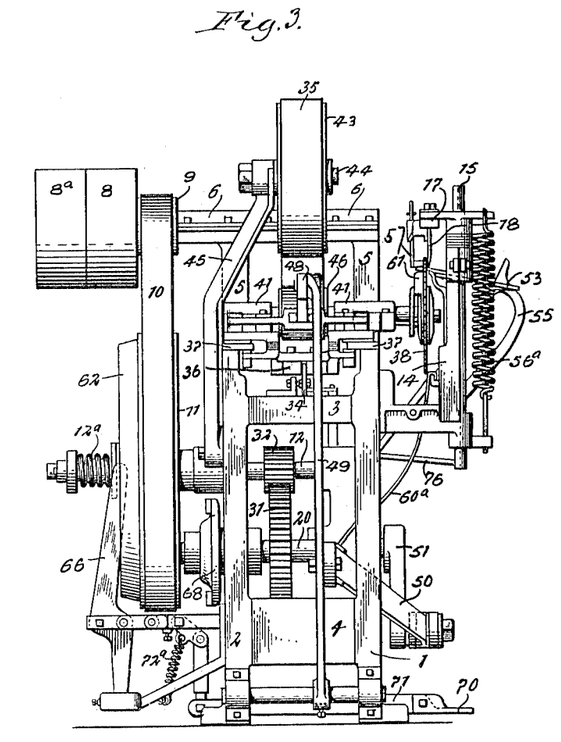
Fig. 3 is a left-hand end elevation.
Figure 4:
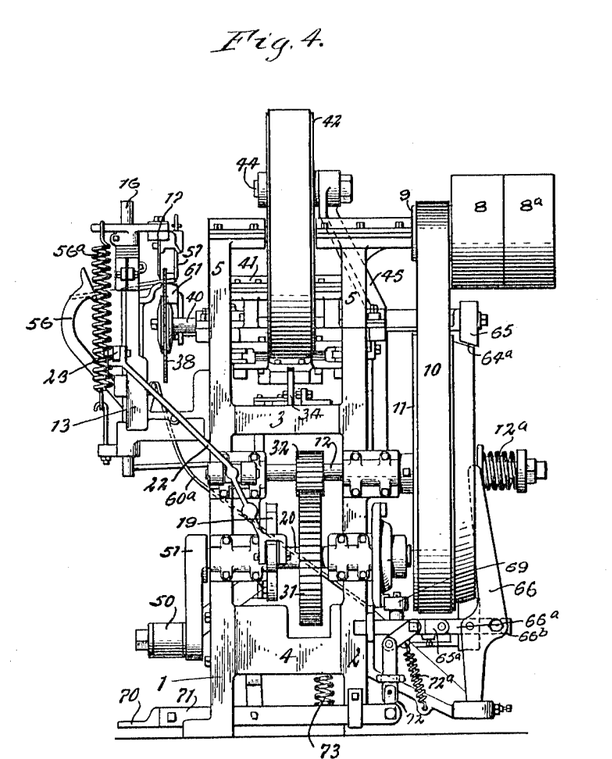
Fig. 4 is a right-hand end elevation.
Figure 5:
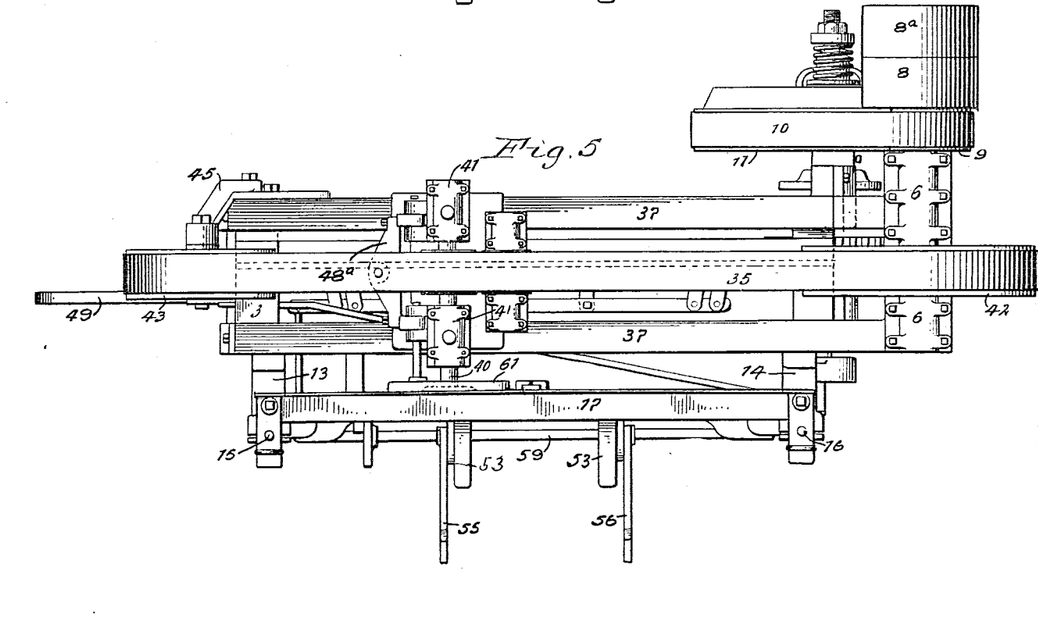
Fig. 5 is a plan view.
Figure 6:
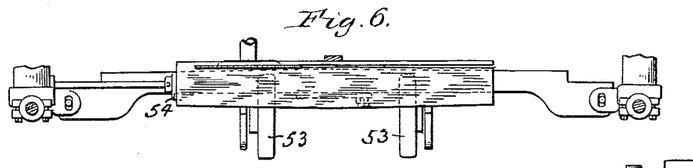
Fig. 6 is a detail section on the line 6—6 of Fig. 8.
Figures 7, 8, 9, 10:
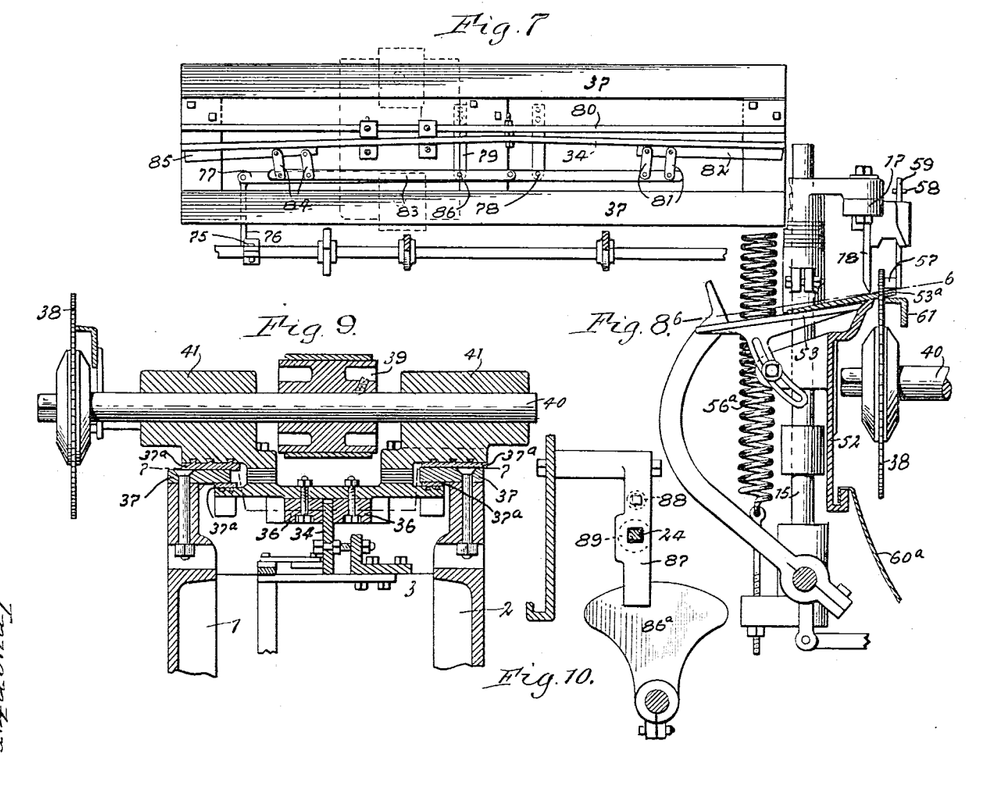
Fig. 7 is a plan view of the frame on which the saw carriage is slidable showing the guides which direct the curved path of the saw and the mechanism for varying the degree of curvature.
Fig. 8 is a detail section on the line 8—8 of Fig. 1 showing the clamping mechanism for holding a stave blank.
Fig. 9 is a detail section on the line 9—9 of Fig. 2, showing the construction of the saw carriage and the ways upon which it travels.
Fig. 10 is a detail on the line 10—10 of Fig. 1, which shows the friction device hereafter described.

*Stave blank rest.*—Secured to the main frame is a hollow secondary frame 52. To this secondary frame 52 are adjustably secured arms or rests 53, upon which the stave blank rests. By adjustment of these arms or rests the desired joint angle for a barrel of any desired radius may be attained. In Fig. 8 this construction is shown with a stave blank in place, the bevel being shown at 53ª. In order that the operator may place the stave blank in the proper position longitudinally, a stop or rest 54 is provided (see Fig. 6) which may be adjusted to any desired stave length. Mounted upon and traveling with the saw carriage is a rest or support 61 (Figs. 8 and 15) which comes up close to the back side of the saw and serves to steady the waste piece or strip of the blank which is being severed by the saw. The ends of this rest are bent downwardly so as not to strike the ends of the stave as the carriage moves. This attachment is of large importance, since without it there is danger, especially with brash or shaky or gummy wood, of the saw macerating the edge of the stave or of the waste piece clogging the saw.

Figures 12, 13, 14, 15, 16:
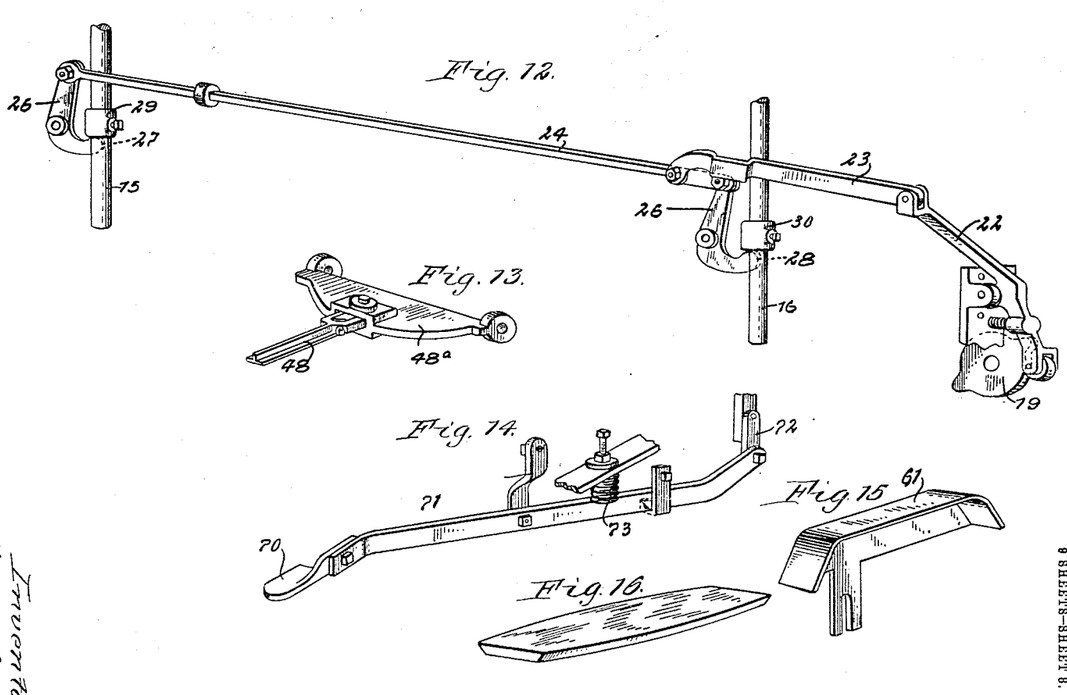
Fig. 12 is a perspective view of the mechanism which actuates the clamps which hold the stave blank.
Fig. 13 is a perspective of the double pivot yoke connecting the saw carriage with the reciprocating bar.
Fig. 14 is a detail perspective of the foot lever mechanism.
Fig. 15 is a detail perspective of the stave support which travels with the saw carriage and which fits close to the back of the saw.
Fig. 16 is a perspective of a stave jointed by my machine.

*Clamping mechanism.*—Secured to the front portion of the frame 1 are two upright standards 13 and 14. These standards carry two reciprocating rods 15 and 16 which are secured to and guide a longitudinal bar 17. This bar 17 carries the clamping fingers 18, which come down upon the stave blank over the rests 53 and clamp and hold the blank during the jointing operation. The bar 17 is reciprocated to clamp and release a stave blank in the following manner: Springs 56ª, through the rods 15 and 16 and the bar 17, normally hold the fingers 18 in clamping position. The mechanism for releasing the same is best shown in Fig. 12. A cam 19 on the shaft 20 actuates a lever 22, medially pivoted to a fixed part of the machine. This lever 22 is pivoted to a connecting rod 23, which, in turn, is pivoted to the long longitudinal rod 24. Pivoted to the rod 24 are bell-crank levers 26, medially pivoted to a fixed part of the machine, and the free ends 27 and 28 bear against the under sides of lugs 29 and 30 which are adjustably secured to the rods 15 and 16, respectively. It will be evident that when a high point of the cam 19 acts on the lever 22, the rods 15 and 16 will be raised against the springs 56ª, and the clamping fingers 18 will be released.

*Placement of stave blank.*—For the lateral adjustment or placement of the stave blank, two arms 55 and 56 are provided which serve to shove the blank evenly rearwardly upon the rests 53, and an eye-guide, 57, that is to say, a guide to the eye of the operator is mounted vertically and slidably on the back side of the bar 17 and depends over, but clear of, the space for the stave blank. A set-screw or other limiting means prevents this guide 57 from depending in the way of the blank. As this guide descends when the operator releases the fingers 55 and 56, the lower motion is limited by a set-screw 58 fastened to a longitudinal bar 59.

*Reciprocating movement of saw carriage.*—The reciprocating movement of the saw carriage is obtained by means of a connecting rod 48 pivoted to a lever 49, said lever 49 being pivoted at its other end to the frame of the machine, a rod 50 pivoted to said lever 49 and to a crank 51 on the shaft 20. Since the rod 48 has movement pivotally in a vertical plane and as the saw carriage has lateral movement in a horizontal plane, as hereafter described, said rod 48 is connected to the saw carriage by the double pivot plate 48ª, shown in Fig. 13, the rod 48 being pivoted thereto by a vertical pivot to permit such lateral movement and said plate 48ª being pivoted to said carriage by two horizontal pivots which permit of the up-and-down movement of said rod 48. The pulleys over which the belt 35 which rotates the saw passes are of sufficient width of face to permit the small lateral movement in travel of the saw carriage without displacement of the belt.

*Saw carriage construction.*—This is best shown in Fig. 9. The carriage slides on two flat ways 37 mounted on the frame of the machine; and upon the under side of the carriage I provide four antifriction plates 37ª which carry the carriage upon said ways 37. Secured to the under side of the carriage also are four antifriction blocks 36 which bear against the opposite sides of the carriage bilge guide 34, which is adjustably secured to the bed of the machine. It is evident, therefore, that the saw carriage will travel in a horizontal plane, but will be compelled to follow a curve upon that plane conformable to the curvature of the carriage bilge guide 34.

Figure 11:
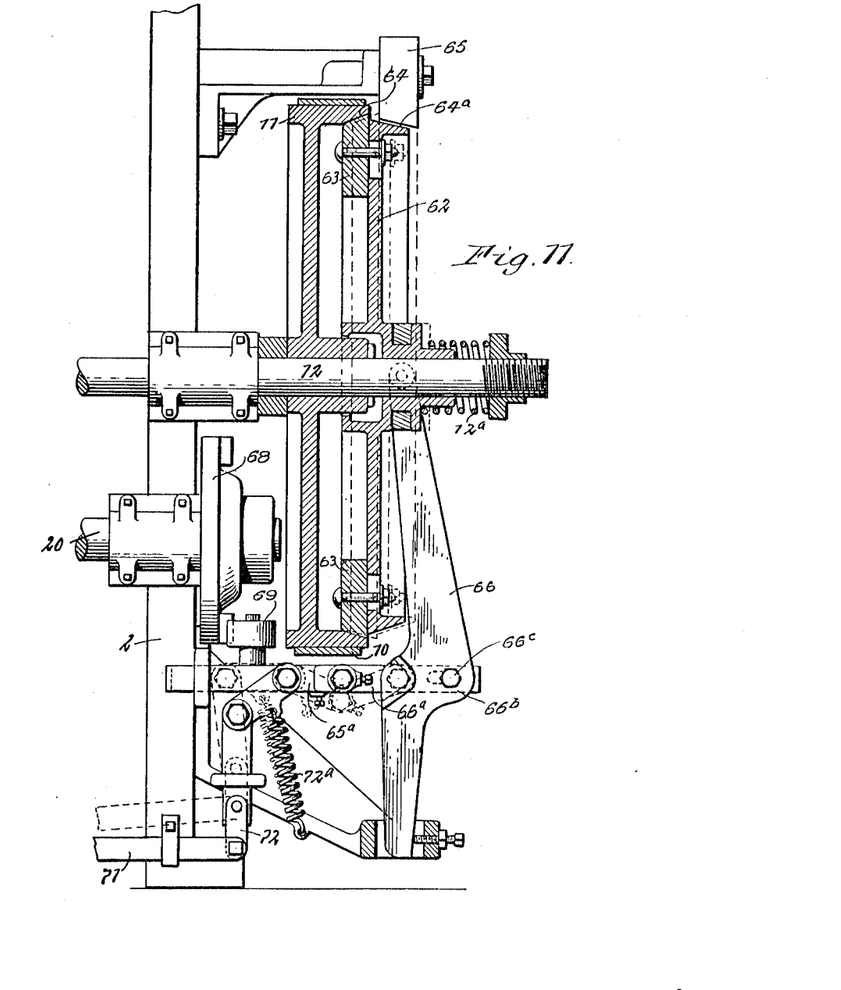
Fig. 11 is a sectional view through the power transmitting mechanism including the clutch, the frame and clutch operating mechanism being shown in elevation.

*Clutch and brake mechanism.*—This is clearly shown in Fig. 11. The pulley 11 is mounted revolubly on shaft 12 and constitutes one member of a friction clutch. The other member 62 of the clutch is splined slidably on the shaft 12 and has a plurality of clutch blocks 63, conformable to frictional engagement with the inner beveled face 64 of the pulley 11. The outer face 64ᵃ of the member 62 is beveled to contact, in the out or disengaged position, with a plurality of brake blocks 65 secured to a fixed portion of the machine. A spring 12ᵃ tends to hold the two members 11 and 62 in frictional contact. The pulley 11 being in constant rotation, when the two clutch members are brought into action, the shaft 12 will be rotated; and when the clutch member 62 is thrown into contact with the brake blocks 65, the shaft 12 will be stopped and held against rotation; and, moreover, the contacting faces of the member 62 and the brake blocks 65 are on so slight an angle that, when thrown into the brake position, the force of the spring 12ᵃ is not sufficient to disengage them, and the member 62 will remain in the brake position until released as hereafter described.

*Clutch and brake operating means.*—Since it is necessary to stop the rotation of the shaft 12 and the action of the several parts driven by it at the end of each movement of the saw in jointing a stave, I provide a yoke lever 66 which is collared to the hub of the clutch and brake member 62. This lever 66 is fulcrumed at its lower end to a fixed part of the machine. A toggle 65ᵃ pivoted to a bar 66ᵃ, pivoted to a bar 66ᵇ which is slot-pivoted to the lever 66 at 66ᶜ, serves to control the lever 66. A cam roller 69 is rigidly mounted upon the bar 66ᵃ, to which the toggle 65ᵃ is pivoted, and contacts with the high points on a cam 68 in rotation upon the shaft 20. The cam 68 has two high points, one or the other of which will strike the roller 69 at the end of each stroke of the saw. When the toggle 65ᵃ is in the position shown in full lines in Fig. 11, the action of the cam 68 upon the roller 69 will cause the bar 66ᵇ to force the lever 66 outwardly and force the friction member 62 into contact with the brake blocks 65. This will stop the rotation of the shaft 12 and hold the friction member in the brake position until it is released. When the toggle 65ᵃ is thrown into the position shown in broken outline in Fig. 11, the bar 66ᵇ will act upon the lever 66 and release the clutch member 62 from the brake blocks 65, and the spring 12ᵃ will force it into the clutch position. To start the intermittent mechanism I provide a treadle 70 in position to be pressed by the foot of the operator (see Fig. 14). This treadle is connected to a lever 71 which is pivoted to the frame of the machine and connected to the toggle 65ᵃ by a short pivot plate 72. An adjustable spring 73 serves to return the treadle to normal position and to permit the spring 72ᵃ to return the toggle 65ᵃ to normal position. It will now be evident that, when the toggle 65ᵃ is in the normal position shown in full lines in Fig. 11, when a high point of the cam 68 acts on the roller 69, the clutch member 62 will be forced to the brake position and will remain there until released by the toggle 65ᵃ through the treadle connections. When, through the treadle connections, the operator throws the toggle 65ᵃ to the other position against its spring 72ᵃ, the lever 66 will act and release the clutch member 62 from the brake blocks 65, and, although the cam 68 will continue to act upon the roller 69, so long as the operator holds the treadle, the lever 66 will not be affected, and the shaft 12 will continue to rotate until the treadle is released. By these means all reciprocatory movements will be automatically stopped after a single movement of the saw, but at the same time the operator may repeat or continue the movements at will.

*Bilge curve mechanism.*—Since stave blanks are of different widths, it follows that the bilge curve of each stave must vary directly with its width in order to make a symmetrical barrel; and, therefore, the saw must travel on a curve of greater or less radius, according to the width of the stave.

Figure 17:
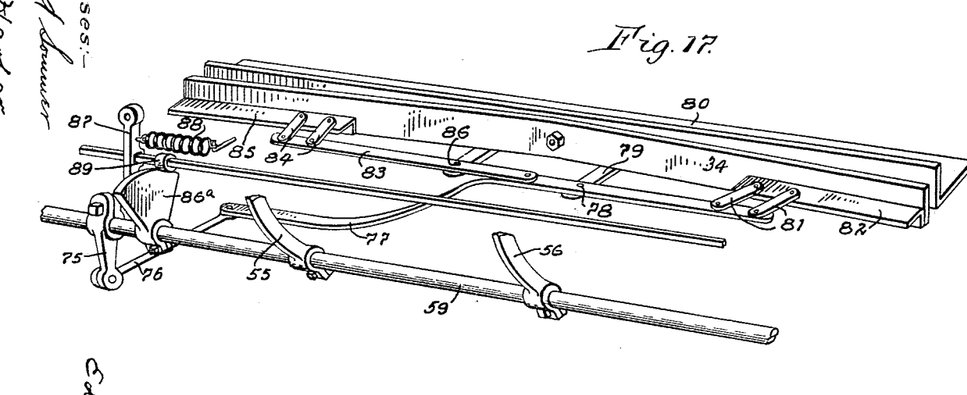
Fig. 17 is a detail in perspective of the means for regulating the degree of curvature of travel of the saw and of the clamping mechanism for holding the same during movement of the saw.

Referring especially to Figs. 7 and 17, mounted upon the longitudinal rod 59, which is pivotally supported at its ends, are placing arms 55 and 56, the upper free ends of which serve to bear against the outer edge of a stave blank when laid upon the supports 53 and to shove the blank transversely to the proper position under the eye-guide 57. Rigidly secured to the rod 59 is a lever 75, which is pivoted to a rod 76, which, in turn, is pivoted to a lever arm 77, which is fulcrumed at 78 to a bar 79 secured rigidly to an angle plate 80 on the bed of the machine. The outer end of the lever 77 is attached by two pivot links 81 to a plate 82 secured to the carriage guide 34 adjacent to one end. Pivoted to said lever 77 is a second lever 83 which is fulcrumed at 86 to the angle plate 80, and which, at its other end, is connected by pivot links 84 to a plate 85 secured to the carriage guide 34 adjacent to its opposite end. The carriage guide 34 is rigidly secured centrally to the angle plate 80. It will now be evident that, as the rod 59 is rotated by movement of the placing arms 55 and 56 outwardly, the lever connections just described will cause the carriage guide 34 to be curved over a shorter radius, and movement of the placing arms 55 and 56 inwardly will cause the carriage guide to be curved upon a longer radius. In this manner the curvature of the carriage guide 34 will vary directly with the position of the guides or arms 55 and 56, which, of course, will be positioned according to the width of the stave blank.

*Guide clamping means.*—In order to hold the guides 55 and 56 rigidly during the period of jointing, so that there shall be no change in the predetermined curvature of the carriage guide 34, I mount on the rod 59 a segment 86ª (Fig. 17) and pivot to the frame of the machine a bar 87 which bears against one side of the segment 86, and which is held in such frictional contact by a spring 88. The rod 24 which lifts the rods 15 and 16 passes through a slot in the bar 87, and on said rod 24 is secured a lug 89, capable of bearing against said bar 87 in opposition to said spring 88. When the bar 24 moves to lift the stave clamping fingers, the lug 89 will bear against the bar 87 and release the segment 86 until the stave clamping fingers are again in action. By this means the guides 55 and 56 are held firmly against any movement during the saw operation and any change of curvature of the carriage guide 34 is prevented. The secondary frame 52 has an opening in its front side and a cover 59ª over said opening, by the removal of which the operator may get his hand inside said frame to adjust any mechanism adjacent thereto. The cuttings, sawdust and waste strips drop upon a deflector 60ª which directs them to the floor or to any desired point for removal.

*Operation of the machine.*—Assuming the saw to be rotating and all of the parts having intermittent movement at rest, the operator places a stave plank upon the rests 53. He then moves the guide arms 55 and 56 against the front edge of the blank and shoves the blank rearwardly under the eye-guide 57 in proper position for jointing. This movement of the guides 55 and 56 through the rod 59 and connections with the levers 77 and 83 adjusts the carriage guide 34 to the proper curvature or bilge of the blank. The operator then presses the treadle 70, which mediately acts upon the toggle 65ª, and throws the clutch members 11 and 62 into action, which mediately sets the shaft 20 in rotation. This first causes the cam 19 to release the lever 22, and this, through the rods 23, 24, and bell-crank levers 26 allows the rods 15 and 16 to respond to the springs 56ª and bring the clamping fingers 18 down upon the stave blank. As this is done, the rod 24 through the lug 89 releases the bar 87 so that it clamps the segment and hold the rod 59 against rotation. The crank 51 on the shaft 20 now acts through the rod 50 upon the lever 49, rod 48 and pivot plate 48ª and moves the carriage over the carriage bed, the carriage following the predetermined curvature of the carriage guide 34. This causes the saw to joint the stave blank upon one edge; and as the saw completes this stroke, a high point on the cam 68 strikes the roller 69 and, through the toggle mechanism, forces the lever 66 outwardly, disconnecting the clutch members and throwing the clutch member 62 into contact with the brake blocks 65, thus stopping the intermittent mechanism. At the same time the clutch is thrown out, the cam 19 has acted upon the lever 22, raising the clamping fingers and releasing the segment holding the placing guides. The operator now reverses the stave blank and repeats the operation to joint the other edge.

I claim:

1. In a stave jointing machine, in combination with stave blank holding means, a saw, a saw carriage, a bed upon which said carriage travels in horizontal plane, and means for causing said carriage to travel upon a curve on said plane and a curve varying in radius with the width of the stave blank comprising a carriage guide rigidly secured medially, blocks on said carriage engaging said guide, levers pivoted to the free ends of said guide and fulcrumed to a fixed part of the machine, and placing guides for moving a stave blank to position pivoted mediately to said levers.

2. In a stave jointing machine, in combination with a saw constantly driven in rotation, means for imparting intermittent movement to other mechanisms coöperating therewith comprising a clutch member constantly driven, a clutch member intermittently driven, a lever for throwing said second-mentioned clutch member in and out of action, a brake for engaging said second clutch member and holding it out of action and against rotation until released by said lever, a bar acting upon said lever, a cam driven by a shaft driven by said clutch, a roller on said bar to contact with said cam for throwing said second member of said clutch out of action, a toggle for causing said bar to throw said clutch member into action, and a treadle governing said toggle.

3. In a stave jointing machine, means for placing and holding a stave blank in position for jointing comprising a rest, placing arms for bearing against the front edge of the stave blank to adjust the same transversely, clamping means for holding said placing arms rigidly during the sawing operation, means for clamping the blank to said rest during the jointing, a saw carriage movable with relation to the rest, a guide for the saw carriage and means movable in proportion to the movement of the placing arms for adjusting the guide of the saw carriage.

4. In a stave jointing machine, in combination with a saw and a saw carriage, a bed for said carriage for guiding the same in a horizontal plane, a guide for said carriage to direct its movement over a curve to form the bilge curve of a stave, a shaft and a crank thereon for causing reciprocatory movement of said carriage, a lever and connecting rods for connecting said crank with said carriage, levers for bending said carriage guide on curves of varying radii, placing guides for placing a stave blank in position for jointing, and connections between said placing guides and said last-mentioned levers for causing bending of said carriage guide proportional to the width of the stave blank.

EDWIN F. BEUGLER.

Witnesses:
  HUBERT W. ENGLISH,
  D. H. HARPER.

Copies of this patent may be obtained for five cents each, by addressing the "Commissioner of Patents, Washington, D. C."